No. 650,772. Patented May 29, 1900.
G. C. AVERY.
SEED PLANTER.
(Application filed Dec. 2, 1899.)
(No Model.)

Witnesses
Marcus L. Byng.
F. S. Belt.

Inventor
George C. Avery
by
his Attorney

UNITED STATES PATENT OFFICE.

GEORGE C. AVERY, OF LOUISVILLE, KENTUCKY, ASSIGNOR TO THE B. F. AVERY & SONS, OF SAME PLACE.

SEED-PLANTER.

SPECIFICATION forming part of Letters Patent No. 650,772, dated May 29, 1900.

Application filed December 2, 1899. Serial No. 739,059. (No model.)

*To all whom it may concern:*

Be it known that I, GEORGE C. AVERY, a citizen of the United States, residing at Louisville, in the county of Jefferson and State of Kentucky, have invented certain new and useful Improvements in Seed-Planters; and I do hereby declare the following to be a full, clear, and exact description of the invention, such as will enable others skilled in the art to which it appertains to make and use the same.

My invention relates to improvements in seed-planters, and particularly to that class of planters which are adapted for sowing corn and cotton-seed.

The present invention relates especially to the mechanism for cutting off and dropping the seed from the hopper of a corn or cotton planter; and it consists in a cut-off mechanism comprising a vertical standard adjustably secured in the hopper of a corn-planter, a spring-pressed cut-off piece, and a knock-out piece carried by the said cut-off piece, the construction being such that the cut-off and knock-out pieces can be adjusted to different heights, so as to accommodate disks of different thicknesses in the hopper.

It also consists in certain other novel constructions, combinations, and arrangements of parts, as will be hereinafter fully described and claimed.

Figure 1:
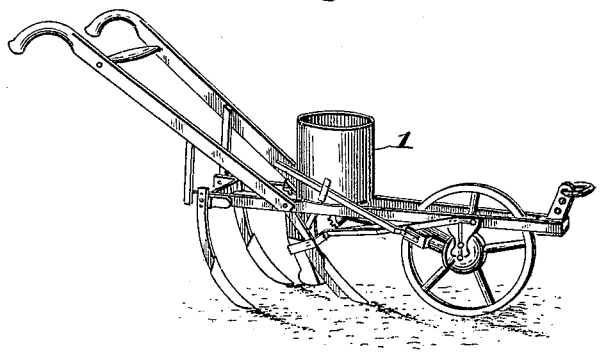
Figure 2:
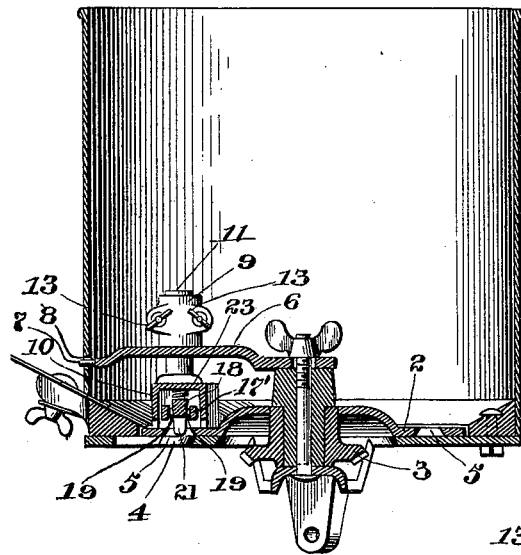
Figure 3:
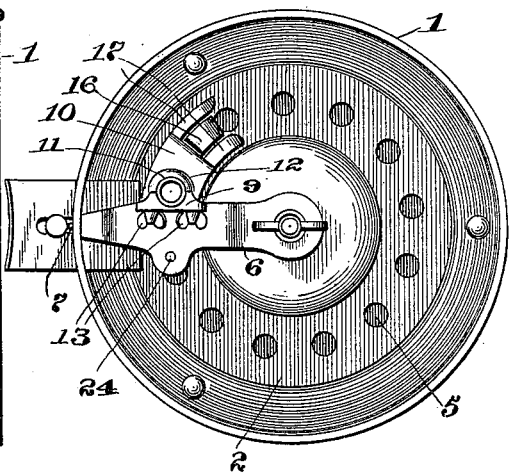
Figure 4:
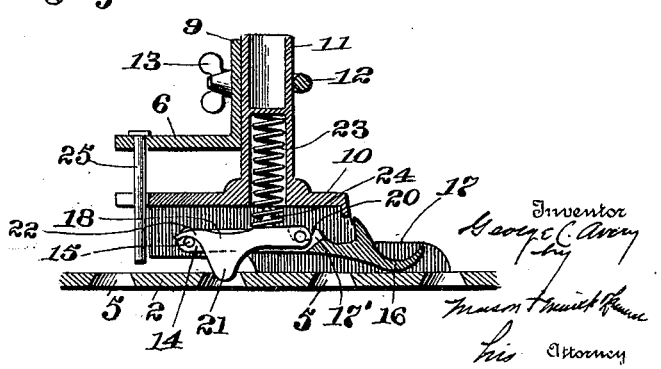

In the accompanying drawings, Figure 1 represents a perspective view of a seed-planter constructed in accordance with my invention. Fig. 2 represents a vertical sectional view through the said hopper. Fig. 3 represents a top plan view of the same; and Fig. 4 represents an enlarged sectional view through the cut-off and knock-out mechanism, showing the manner in which the same is made adjustable.

My improved cut-off and dropping mechanism is particularly designed for use in seed-hoppers which employ disks having holes therein for selecting one or more seeds at a time from the hopper and passing them beneath a suitable knock-out and dropping mechanism. As illustrated in the drawings, I preferably apply my cut-off device to a hopper, as 1, in which is used a circular rotating disk 2, the said disk finding suitable bearings in the bottom of the hopper. A gear-wheel, as 3, is secured to the under side of the disk, so as to rotate the same, the said gear being connected by other gearing with a wheel of the planter upon which the hopper is placed. In the bottom of the hopper and to one side of the gear-wheel is formed an aperture, as 4, which is arranged beneath the path of a series of holes or apertures 5, formed in the circular disk 2. Above these apertures and inside the hopper is mounted a cross-piece 6, secured at its inner end by means of a thumb-nut and bolt to a vertical standard arranged centrally of the hopper. The outer end of the brace 6 is provided with a reduced end portion, as 7, which engages an aperture 8, formed in the side of the hopper. This brace-piece 6 will therefore be held stationary and firmly secured in place within the hopper. About midway of the brace 6 is formed a vertical half-bearing 9. A cut-off and dropping mechanism is mounted so as to extend partially beneath the brace-piece 6, the housing 10 of the said mechanism being provided with a vertical standard 11, which projects upwardly from the said housing and is adapted to engage the half-bearing 9 upon the said brace-piece 6. A U-shaped clip, as 12, is placed about the standard, its free ends extending through the apertures in the half-bearing and being drawn tightly against the said bearing by means of thumb-nuts 13 13. The brace-piece 6 is arranged sufficiently far above the housing 10 to permit the standard 11 to have a vertical adjustment in the half-bearing 9. This adjustment can be easily accomplished by loosening the thumb-nuts 13 and raising or lowering the standard the required amount and again tightening the thumb-nuts. By this adjustment the housing and the mechanism carried thereby can be adjusted to accommodate disks in the hopper of different thicknesses. The housing 10 is preferably formed upon the arc of a circle which coincides with the circle upon which the apertures in the disk are arranged. The housing 10 is hollow upon its under side, thus forming a recess to receive a pivoted cut-off piece, as 14. The piece 14 is pivoted, as at 15, in one end of said housing and at the opposite end is provided with a nose portion 16, which is curved upon its under surface, so as to slide easily over the apertured plate. It will operate as the plate is moved beneath it to cut off all the seed but those which have dropped into the apertures formed in the said disk. The cut-off nose 16 plays up and down between projections 17 17, formed upon the housing 10. The pivoted end of the cut-off piece 14 is preferably bifurcated, as at 17', the bifurcated portion being adapted to receive a pivoted knock-out piece or dropper, as 18. This knock-out piece is provided at one end with trunnions 19 19, which fit in bearings 20 in the upper side of the cut-off piece 14. Near the other end of said knock-out piece 18 is formed a downwardly-extending projection, as 21, which is arranged directly above the aperture 4 in the bottom of the hopper, so that it may force the seed through the same whenever the holes 5 in the disk bring the kernel beneath the said projection. The knock-out piece is limited in its downward movement by a projection, as 22, formed upon the end thereof. In order to hold the cut-off piece and the dropper or knock-out piece in continual engagement with the disk 2, I interpose a spring, as 23, between the knock-out piece and the standard 11. The knock-out piece is preferably provided with a projection 24 upon its upper surface for engaging the lower end of the spring 23 and holding the same in position. The upper end of the spring preferably extends into the standard 11, which is made hollow for this purpose. A stop is formed in the said hollow standard to engage the upper end of the said spring. It will be seen that by this construction and arrangement of the parts a single spring operates to hold both the cut-off piece and the knock-out piece constantly in engagement with the disk 2. The end of the housing 10 which extends beneath the brace-piece 6 is provided with a bifurcated projection which is adapted to engage a short depending rod, as 25, which is secured at its upper end to the said brace-piece 6. This depending rod holds the housing 10 in proper alinement when the clip is loosened for raising or lowering the standard. This prevents the parts from getting out of proper place and requires no attention on the part of the one adjusting the device.

It will be apparent that when the disk 2 is rotated the seed which fall into the apertures 5 therein will be carried beneath the nose of the cut-off piece, and when they arrive over the aperture 4 in the bottom of the hopper the said seeds will be knocked or forced through the said aperture by means of the knock-out piece or dropper. This mechanism insures the dropping of the seed. By employing disks having holes of different sizes a greater or less number of seeds will be permitted to pass beneath the cut-off piece and be forced through the bottom of the hopper.

The device is particularly well adapted for forcing a single grain or seed through the bottom of the hopper, and thus planting one seed at a time.

The parts are simple in construction and not easy to get out of order and yet are positive in their action.

Having now described my invention, what I claim as new, and desire to secure by Letters Patent, is—

1. A cut-off and dropper mechanism for seed-planters, comprising an adjustable housing mounted in a hopper of a planter, a disk moving in the said hopper beneath the said mechanism, the said disk having seed-carrying apertures formed therein, a spring-pressed cut-off piece and a spring-pressed knock-out piece mounted in the said housing, whereby one or more seeds are permitted to pass beneath the said mechanism and are forced through an aperture in the bottom of the hopper, substantially as described.

2. A seed-sowing mechanism, comprising a hopper having an aperture in its bottom, a disk mounted in said hopper and provided with a series of seed-carrying apertures, means for rotating the said disk, a cut-off mechanism mounted above the disk, means for adjusting the said cut-off mechanism vertically to accommodate disks of different thicknesses, substantially as described.

3. A cut-off mechanism for planters, comprising a hopper having an aperture in its bottom, a seed-carrying disk mounted in said hopper, a brace mounted upon the same and having a vertical bearing, a cut-off and dropping mechanism mounted beneath the said brace, a standard carrying the said mechanism and engaging the said bearing, and a clamp for holding the said standard in the said bearing whereby the cut-off mechanism may be adjusted to different heights according to the thickness of the seed-carrying disk passing beneath it, substantially as described.

4. A seed cut-off and dropping mechanism for planters, comprising a hopper, a rotating disk provided with seed-carrying apertures, a housing mounted upon the said disk, a pivoted cut-off piece and a pivoted knock-out piece mounted in the said housing and engaging the said rotating disk, a standard carrying the said housing, a brace having a bearing for engaging the said standard, and a clamp for holding the standard in different adjusted positions in the said bearing, substantially as described.

5. In a seed cut-off and dropping mechanism, the combination with a suitable hopper and a seed-carrying disk mounted therein, of a housing arranged above the said disk, a pivoted cut-off piece mounted in the said housing and provided at one end with a nose portion curved upon its under side so as to pass easily over the seed-carrying disk, a knock-out piece pivoted in a bifurcated portion of the cut-off piece, and a spring engaging the said knock-out piece, whereby both the knock-out piece and the cut-off piece will be held in continual engagement with the seed-carrying disk, substantially as described.

6. In a cut-off and dropping mechanism for planters, the combination with a hopper and seed-carrying disk mounted therein, of a housing mounted above the said disk, the said housing being segmental in shape to correspond with the curved outer edge of the seed-carrying disk, means for adjustably supporting the said housing, a depending rod or pin mounted upon the housing-support and engaging a bifurcated portion upon the said housing, whereby when the housing is adjusted vertically it will be held in proper alinement, a pivoted cut-off piece and a pivoted knock-out piece mounted in the said housing so as to bear upon the disk, substantially as described.

7. In a seed cut-off and dropping mechanism for planters, the combination with a hopper and seed-carrying disk, of a housing mounted above the said disk, means for holding the said housing adjustably in position, a pivoted cut-off piece mounted in the said housing and engaging with its free end the seed-carrying disk, the said cut-off piece being bifurcated at its opposite end, a knock-out piece provided with trunnions at one end adapted to engage bearings in the cut-off piece, a downwardly-extending projection upon the other end of said piece for forcing the seed through the bottom of the hopper, an upwardly-extending projection upon the top of the said knock-out piece, a spring engaging the latter projection at its lower end and extending upwardly into a recess in the housing at its upper end, the structure being such that the spring by engaging the knock-out piece will hold both the said knock-out piece and the cut-off piece against the seed-carrying disk by a yielding pressure, substantially as described.

In testimony whereof I hereunto affix my signature in presence of two witnesses.

GEORGE C. AVERY.

Witnesses:
S. E. WIARD,
O. G. KANSTON.